United States Patent
Choi et al.

(10) Patent No.: US 11,975,296 B2
(45) Date of Patent: *May 7, 2024

(54) PORE-FILLED ION EXCHANGE POLYELECTROLYTE COMPOSITE MEMBRANE FROM WHICH SURFACE ION EXCHANGE POLYELECTROLYTE HAS BEEN REMOVED AND METHOD FOR MANUFACTURING SAME

(71) Applicant: Toray Advanced Materials Korea Inc., Gyeongsangbuk-do (KR)

(72) Inventors: Young Woo Choi, Cheongju-si (KR); Mi Soon Lee, Jeonju-si (KR); Tae Young Kim, Jeonju-si (KR); Young Gi Yoon, Daejeon (KR); Beom Jun Kim, Jeollabuk-do (KR); Min Ho Seo, Yongin-si (KR); Chi Young Jung, Seongnam-si (KR); Jong Min Lee, Jeonju-si (KR); Nam-jo Jeong, Jeonju-si (KR); Seung Cheol Yang, Jeju-si (KR); Ji Yeon Choi, Jeju-si (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 741 days.

This patent is subject to a terminal disclaimer.

(21) Appl. No.: 17/052,518

(22) PCT Filed: Apr. 29, 2019

(86) PCT No.: PCT/KR2019/005141
§ 371 (c)(1),
(2) Date: Nov. 2, 2020

(87) PCT Pub. No.: WO2019/212210
PCT Pub. Date: Nov. 7, 2019

(65) Prior Publication Data
US 2021/0237001 A1    Aug. 5, 2021

(30) Foreign Application Priority Data
May 2, 2018    (KR) .................... 10-2018-0050619

(51) Int. Cl.
*B29C 67/20* (2006.01)
*B01D 69/10* (2006.01)
(Continued)

(52) U.S. Cl.
CPC .......... *B01D 69/12* (2013.01); *B01D 69/107* (2022.08); *B01D 69/125* (2013.01);
(Continued)

(58) Field of Classification Search
CPC ............ B01D 69/125; B01D 2323/345; B01D 2325/42; B29C 2035/0827; B29C 67/20;
(Continued)

(56) References Cited

U.S. PATENT DOCUMENTS 7,452,621 B2    11/2008    Kim et al.
7,674,349 B2    3/2010    Hiraoka et al.
(Continued)

FOREIGN PATENT DOCUMENTS

EP    2857442 A1    4/2015
JP    2001157823 A    6/2001
(Continued)

OTHER PUBLICATIONS

Translation of JP-2006172765-A (published on Jun. 29, 2006).*
(Continued)

*Primary Examiner* — Leo B Tentoni
(74) *Attorney, Agent, or Firm* — Snell & Wilmer L.L.P.

(57) ABSTRACT

A pore-filled ion exchange polyelectrolyte composite membrane from which the surface ion exchange polyelectrolyte has been removed and a method of manufacturing the same are provided. The ion exchange polyelectrolyte composite
(Continued)

membrane exhibits low film resistance and low in-plane-direction swelling degree, and has a smaller film-thickness than a commercial film, and thus, can be used for various purposes. In addition, since the pore-filled ion exchange polyelectrolyte composite membrane is continuously manufactured through a roll-to-roll process, the manufacturing process is simple, and manufacturing costs can be greatly reduced.

11 Claims, 8 Drawing Sheets

(51) Int. Cl.
*B01D 69/12* (2006.01)
*B29C 35/08* (2006.01)
*B29C 70/50* (2006.01)
*C08J 3/24* (2006.01)
*C08J 5/22* (2006.01)

(52) U.S. Cl.
CPC .... *B01D 2323/286* (2013.01); *B01D 2323/30* (2013.01); *B01D 2323/345* (2013.01); *B01D 2325/42* (2013.01); *B29C 2035/0827* (2013.01); *B29C 70/504* (2013.01); *C08J 5/2218* (2013.01)

(58) Field of Classification Search
CPC .... B29C 70/504; C08J 3/24; C08J 5/22; C08J 5/2218
USPC .......................... 264/136, 232, 238, 425, 495
See application file for complete search history.

(56) References Cited

U.S. PATENT DOCUMENTS

| | | | | |
|---|---|---|---|---|
| 2008/0216942 A1* | 9/2008 | Hiraoka | ............ | H01M 50/403 156/145 |
| 2008/0268314 A1* | 10/2008 | Han | ............ | H01M 4/8621 204/192.1 |
| 2008/0290022 A1* | 11/2008 | Sanchez | ............ | C08J 7/12 568/33 |
| 2011/0059387 A1 | 3/2011 | Choi et al. | | |
| 2014/0305863 A1* | 10/2014 | Van Engelen | ....... | B01D 69/125 427/508 |
| 2014/0315119 A1 | 10/2014 | Choi et al. | | |
| 2016/0354771 A1* | 12/2016 | Inomata | ................ | B01D 71/44 |
| 2021/0197187 A1 | 7/2021 | Choi et al. | | |

FOREIGN PATENT DOCUMENTS

| | | | | |
|---|---|---|---|---|
| JP | 2006172765 A | * | 6/2006 | ............ Y02F 70/50 |
| JP | 2009170350 A | | 7/2009 | |
| JP | 2012158726 A | | 8/2012 | |
| WO | 200192383 A1 | | 12/2001 | |
| WO | 2005098875 A1 | | 10/2005 | |
| WO | 2006123529 A1 | | 11/2006 | |
| WO | 2008032597 A1 | | 3/2008 | |
| WO | 2008096467 A1 | | 8/2008 | |
| WO | 2015064820 A1 | | 5/2015 | |

OTHER PUBLICATIONS

Translation of JP-2009170350-A (published on Jul. 30, 2009).*
KIPO; Notice of Allowance dated May 1, 2010 in Application No. 10-2018-0050619.
KIPO; Office Action dated Jul. 5, 2019 in Application No. 10-2018-0050619.
WIPO; International Search Report and Written Opinion dated Aug. 9, 2019 in Application No. PCT/KR2019/005141.
JPO; Office Action dated Dec. 16, 2021 in Application No. 2021-512345.
EPO; Extended European Search Report dated Jan. 4, 2022 in Application No. 19796707.8.
Molau "Heterogeneous Ion-Exchange Membranes" Journal of Membrane Science, 8, pp. 309-330 (1981).

* cited by examiner

PORE-FILLED ION EXCHANGE POLYELECTROLYTE COMPOSITE MEMBRANE FROM WHICH SURFACE ION EXCHANGE POLYELECTROLYTE HAS BEEN REMOVED AND METHOD FOR MANUFACTURING SAME

CROSS-REFERENCE TO RELATED APPLICATIONS

This application is a national stage entry of International Patent Application No. PCT/KR2019/005141, filed Apr. 29, 2019, which claims priority to Korean Patent Application No. 10-2018-0050619 filed May 2, 2018, the disclosures of which are hereby incorporated by reference in their entirety.

TECHNICAL FIELD

The present disclosure relates to a pore-filled ion exchange polyelectrolyte composite membrane from which a surface ion exchange polyelectrolyte has been removed, and a method of manufacturing the same.

BACKGROUND ART

Ion exchange resins refer to a synthetic resin with an ion exchange capacity. In 1935, British B. A. Adams and F. L. Holmes discovered that a resin obtained by condensation of polyhydric phenol and formaldehyde and a resin obtained by condensation of m-phenylenediamine and formaldehyde exchanged ions. It was found that various ions in water can be removed by these resins. Thereafter, systematic research and production on an industrial scale thereof were started in Germany and the United States. During the World War II, in Germany, these resins were used to purify water and recover copper and ammonia in rayon factories, and in the United States, these resins were used for classification of fission products, ultra-uranium elements, and rare earth elements, etc. In addition, the purification of various substances (amino acids, antibiotics, etc.) was facilitated by ion exchange resins, and as the ion exchange membrane was developed, they played a more important role electrochemically. Currently, ion exchange membranes are widely used in the fields of fuel cells, redox flow cells, electrodialysis, desalination, ultrapure water, wastewater treatment and etc. In particular, due to the contribution to the decrease in the use of fossil fuels, ion exchange membranes are attracting worldwide attention as an eco-friendly new and renewable energy production clean technology. Currently, there is the rapid increase in the use of electronic products such as small laptops and mobile phones, resulting in a need for the development of long-life, high-capacity batteries and new fuel cells. Accordingly, research into ion exchange membranes, which are key materials thereof, is actively progressing.

Meanwhile, conventional ion exchange membranes often have a separate support to improve mechanical properties, and specifically, a sheet-like ion exchange resin layer may be provided on one side of the support. However, due to problems such as the compatibility of the support and the ion exchange resin layer, peeling and separation frequently occur at the interface thereof, and accordingly, ion exchange capacity and/or mechanical properties are significantly deteriorated. In addition, in the manufacturing process of the ion exchange membrane, it is very difficult to change the configuration according to the purpose, for example, to control factors such as the thickness, electrical conductivity, and mechanical strength of the membrane, and diameter/ratio of pores.

Accordingly, although the manufacturing process is a simple process, there is a need for research into a general purpose ion exchange membrane of which structure and properties are easily changed according to the use thereof, and which has excellent mechanical strength and durability, and at the same time, a large ion exchange capacity, a low electrical resistance, and a small diffusion coefficient, and into a process that can more easily implement such an ion exchange membrane.

In this regard, Korean Patent Registration No. 10-1814037 discloses an organic-inorganic composite ion exchange membrane and a manufacturing method thereof.

DESCRIPTION OF EMBODIMENTS

Technical Problem

An embodiment of the present disclosure provides a pore-filled ion exchange polyelectrolyte composite membrane from which a surface ion exchange polyelectrolyte has been removed.

An embodiment of the present disclosure also provides a method of manufacturing a pore-filled ion exchange polyelectrolyte composite membrane through a roll-to-roll process.

The technical purposes to be achieved by the present disclosure is not limited to the technical purposes mentioned above, and other technical purposes that are not mentioned above can be clearly understood from the following description by those with ordinary knowledge in the technical field to which the present disclosure belongs.

Solution to Problem

As a technical means to achieve the above-described technical task, one aspect of the present disclosure, a method of manufacturing a pore-filled ion exchange polyelectrolyte composite membrane from which the surface ion exchange polyelectrolyte has been removed includes:
preparing an ion exchange precursor solution including an electrolyte monomer of a quaternary ammonium salt having a cationic group or a sulfonic acid-containing electrolyte monomer having an anionic group, an acrylamide-based crosslinking agent having a tertiary amine functional group, an initiator, and a solvent; impregnating a porous polymer support with the ion exchange precursor solution; feeding an upper film, the porous polymer support, and a lower film to a compression roll to compress the upper film and the lower film on upper and lower portions of the porous polymer support, respectively; preparing a pore-filled ion exchange polymer electrolyte by crosslinking the ion exchange precursor solution by irradiating ultraviolet rays to the porous polymer support on which the upper film and the lower film are compressed; and detaching, from a detachment roll, the porous polymer support containing the pore-filled ion exchange polymer electrolyte, the upper film, and the lower film.

The electrolyte monomer of a quaternary ammonium salt having a cationic group may include a substance selected from (3-acrylamidopropyl)trimethylammonium chloride, (vinylbenzyl)trimethylammonium chloride, and combinations thereof.

The sulfonic acid-containing electrolyte monomer having an anionic group may include a substance selected from sodium 2-acrylamido-2-methylpropane sulfonate, vinylsulfonic acid, sodium vinylsulfonate, sodium allyl sulfonate, sodium 2-methyl-2-propene-1-sulfonate, 3-sulfopropyl acrylate sodium salt, and combinations thereof.

The acrylamide-based crosslinking agent having a tertiary amine functional group may include a substance selected from N,N'bis(acryloyl)piperazine, N,N'-(1,2-dihydroxyethylene)bisacrylamide, N,N'-methylenebisacrylamide, N,N'-methylenebismethacrylamide, and combinations thereof.

The porous polymer support has a pore volume of 40% to 50%, a pore size of 0.07 μm to 0.1 μm, and a thickness of 8 μm to 30 μm.

The porous polymer support is subjected to a hydrophilization treatment before being impregnated with the ion exchange precursor solution.

Each of the upper film and the lower film may include a substance selected from poly(ethylene terephthalate) (PET), polyimide, polyvinyl chloride, low-density polyethylene, low-density polypropylene, and combinations thereof.

One surface of each of the upper film and the lower film which is in contact with the porous polymer support may have been subjected to a hydrophilization treatment.

The compression may be performed through squeeze compression to have a value smaller than the sum of the thickness of the porous polymer support and the thicknesses of the upper film and the lower film fed into the compression roll.

The value is smaller than the sum of the thickness of the porous polymer support and the thicknesses of the upper film and the lower film fed into the compression roll, by 5 μm to 20 μm.

An energy of the ultraviolet rays to be irradiated is 30 mW/cm$^2$ to 50 mW/cm$^2$.

During the crosslinking reaction, the temperature of the porous polymer support and the upper film and the lower film may be equal to or lower than 75° C.

Through the detachment, a polymer resin, which is formed by polymerization through crosslinking, formed on the outside of the porous polymer support may be transferred onto the upper film and the lower film and removed from the porous polymer support.

Another aspect of the present disclosure provides a pore-filled ion exchange polyelectrolyte composite membrane from which the surface ion exchange polyelectrolyte has been removed, the pore-filled ion exchange polyelectrolyte composite membrane including:

a polymer support having a porous structure; and an ion exchange polyelectrolyte with which the polymer support is impregnated, wherein the ion exchange polyelectrolyte does not form on the outside of the polymer support, and the porous structure of the polymer support is exposed to the surface of the ion exchange polyelectrolyte composite membrane.

An area specific resistance (ASR) of the pore-filled ion exchange polyelectrolyte composite membrane is 0.35 Ω·cm$^2$ or less.

A dominant surface roughness height of the pore-filled ion exchange polyelectrolyte composite membrane may be from 200 nm to 350 nm.

The ratio of the thickness of the pore-filled ion exchange polyelectrolyte composite membrane to the thickness of the polymer support is from 1.0 to 1.03.

The thickness of the pore-filled ion exchange polyelectrolyte composite membrane may be from 8 μm to 30 μm.

The weight ratio of the polymer support to the ion exchange polyelectrolyte may be from 1:0.8 to 1:1.1.

Advantageous Effects of Disclosure

A pore-filled ion exchange polyelectrolyte composite membrane according to an embodiment of the present invention exhibits a low film resistance and a low in-plane-direction swelling degree, and has a much smaller film-thickness than a commercial film, and thus, can be used for various purposes.

In addition, since the pore-filled ion exchange polyelectrolyte composite membrane is continuously manufactured through a roll-to-roll process, the manufacturing process is simple, and manufacturing costs can be greatly reduced.

The effects of the present disclosure are not limited to the above effects, and should be understood to include all effects that can be inferred from the detailed description of the present disclosure or the configuration of the disclosure described in the claims.

MODE OF DISCLOSURE

Hereinafter, the present disclosure will be described in more detail. However, the present disclosure may be implemented in various different forms, and the present disclosure is not limited to the embodiments described herein, and the present disclosure is only defined by the claims to be described later.

In addition, terms used in the present disclosure are only used to describe a specific embodiment, and are not intended to limit the present disclosure. Singular expressions include plural expressions unless the context clearly indicates otherwise. In the entire specification of the present disclosure, the wording of 'include a certain element' means that other elements may be further included rather than excluding other elements unless stated otherwise.

A first aspect of the present disclosure provides a method of manufacturing a pore-filled ion exchange polyelectrolyte composite membrane from which a surface ion exchange polyelectrolyte has been removed, the method including:

preparing an ion exchange precursor solution 700 including an electrolyte monomer of a quaternary ammonium salt having a cationic group or a sulfonic acid-containing electrolyte monomer having an anionic group, an acrylamide-based crosslinking agent having a tertiary amine functional group, an initiator, and a solvent; impregnating a porous polymer support 110 with the ion exchange precursor solution 700; compressing an upper film 200 and a lower film 300 respectively on an upper portion and a lower portion of the porous polymer support 110 by feeding the upper film 200, the porous polymer support 110, and the lower film 300 to a compression roll; preparing a pore-filled ion exchange polymer electrolyte by crosslinking the ion exchange precursor solution 700 by irradiating ultraviolet rays to the porous polymer support 110 on which the upper film 200 and the lower film 300 are compressed; and detaching, from a detachment roll, the porous polymer support 110 containing the pore-filled ion exchange polymer electrolyte, the upper film 200, and the lower film 300.

Figure 1:
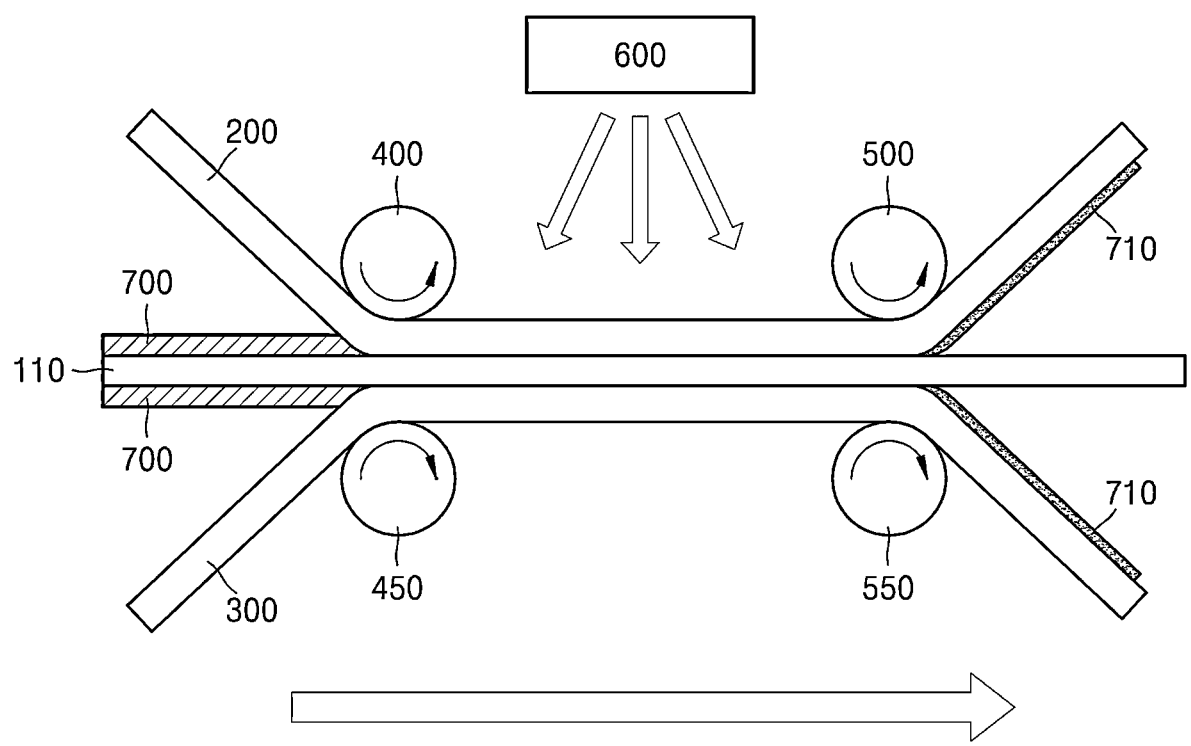
FIG. 1 shows a schematic diagram illustrating a roll-to-roll manufacturing process of an ion exchange polyelectrolyte composite membrane according to an embodiment of the present disclosure.

Hereinafter, a method of manufacturing a pore-filled ion exchange polyelectrolyte composite membrane from which the surface ion exchange polyelectrolyte has been removed according to a first aspect of the present disclosure will be described in detail with reference to FIG. 1, according to processes. FIG. 1 schematically shows a roll-to-roll processing apparatus 101 for a roll-to-roll process used to manufacture the pore-filled ion exchange polyelectrolyte composite membrane from which the surface ion exchange polyelectrolyte has been removed.

First, in an embodiment of the present disclosure, the method for preparing the pore-filled ion exchange polyelectrolyte composite membrane from which the surface ion exchange polyelectrolyte has been removed, includes preparing an ion exchange precursor solution 700 including an electrolyte monomer of a quaternary ammonium salt having a cationic group or a sulfonic acid-containing electrolyte monomer having an anionic group, an acrylamide-based crosslinking agent having a tertiary amine functional group, an initiator, and a solvent.

In an embodiment of the present disclosure, the quaternary ammonium salt having a cationic group may be represented by Formula 1:

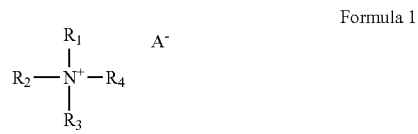

Formula 1

$R_1$ to $R_4$ in Formula 1 may be a substituted or unsubstituted linear or branched alkyl or aryl, and A may be a halogen element.

In an embodiment of the present disclosure, the electrolyte monomer of a quaternary ammonium salt having a cationic group may include, for example, a substance selected from (3-acrylamidopropyl)trimethylammonium chloride, (vinylbenzyl)trimethylammonium chloride, and combinations thereof.

In an embodiment of the present disclosure, the sulfonic acid-containing electrolyte monomer having an anionic group may include a sulfonic acid-containing salt having an anionic group represented by Formula 2:

Formula 2

$R_5$ in Formula 2 may be a substituted or unsubstituted linear or branched alkyl or aryl, and B may be hydrogen and a metal element.

In an embodiment of the present disclosure, the sulfonic acid-containing electrolyte monomer having an anionic group may be in the form of a salt or an acid, and may be, for example, a substance selected from sodium 2-acrylamido-2-methylpropane sulfonate, vinylsulfonic acid, sodium vinylsulfonate, sodium allyl sulfonate, sodium 2-methyl-2-propene-1-sulfonate, 3-sulfopropyl acrylate sodium salt, and combinations thereof. In an embodiment of the present disclosure, the electrolyte monomer of a quaternary ammonium salt having a cationic group may be any substance that is used in the manufacture of an anion exchange polyelectrolyte composite membrane, and the sulfonic acid-containing electrolyte monomer having an anionic group may be any substance that is used in the manufacture of an cation exchange polyelectrolyte composite membrane.

In an embodiment of the present disclosure, the acrylamide-based crosslinking agent having a tertiary amine functional group may be represented by Formula 3:

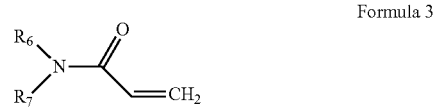

Formula 3

$R_6$ and $R_7$ in Formula 3 may be a substituted or unsubstituted linear or branched alkyl or aryl.

In an embodiment of the present disclosure, the acrylamide-based crosslinking agent having a tertiary amine functional group may include, for example, a substance selected from N,N'bis(acryloyl)piperazine, N,N'-(1,2-dihydroxyethylene)bisacrylamide, N,N'-methylenebisacrylamide, N,N'-methylenebismethacrylamide, and combinations thereof.

In an embodiment of the present disclosure, the crosslinking agent determines the degree of crosslinking of the ion exchange polyelectrolyte composite membrane to be prepared, and depending on the amount of the crosslinking agent, the swelling degree and mechanical properties of the composite membrane may be adjusted.

In an embodiment of the present disclosure, the initiator may be a photoinitiator, and, for example, may be one of Darocur or Irgacure series from among the products of Ciba Geigy Inc. of Switzerland, or may be 2-hydroxy-2-methyl-1-phenylpropane-1-one.

In an embodiment of the present disclosure, the solvent may be a water-soluble solvent such as water, methanol or ethanol. For example, the solvent may be water.

In an embodiment of the present disclosure, in the manufacture of the ion exchange precursor solution 700, when the electrolyte monomer of a quaternary ammonium salt having a cationic group is used, the amount of the electrolyte monomer may be from about 53 parts by weight to about 60 parts by weight, the amount of the crosslinking agent may be from about 3 parts by weight to about 7 parts by weight, and the amount of the solvent may be from about 33 parts by weight to about 44 parts by weight, and the amount of the initiator may be from about 0.1 parts by weight to about 0.5 parts by weight based on 100 parts by weight of the solution in which the electrolyte monomer, the crosslinking agent, and the solvent are mixed.

In an embodiment, in the manufacture of the ion exchange precursor solution 700, when the sulfonic acid-containing electrolyte monomer having an anionic group is used, the amount of the electrolyte monomer may be from about 44 parts by weight to about 47 parts by weight, the amount of the crosslinking agent may be from about 6 parts by weight to about 12 parts by weight, and the amount of the solvent may be from about 44 parts by weight to about 47 parts by weight, and the amount of the initiator may be from about 0.1 parts by weight to about 0.5 parts by weight based on 100 parts by weight of the solution in which the electrolyte monomer, the crosslinking agent, and the solvent are mixed.

When the amount of the electrolyte monomer of the quaternary ammonium salt and the amount of the sulfonic acid-containing electrolyte monomer are each less than the lower limit of the corresponding amount range, the ion exchange capacity to be able to improve the ionic conductivity of a composite membrane to be manufactured may be insufficient. Meanwhile, when the amount of the electrolyte monomer of the quaternary ammonium salt and the amount of the sulfonic acid-containing electrolyte monomer each exceed the upper limit of the corresponding amount range, the durability of a manufactured composite membrane may be reduced. In addition, when the amount of the crosslinking agent is less than the lower limit of the range, the degree of crosslinking may be insufficient, so that the durability of the produced composite membrane may be reduced. When the amount of the crosslinking agent exceeds the upper limit of range, the degree of crosslinking may be too high and the ionic conductivity of the produced composite membrane may be significantly reduced.

Next, in an embodiment of the present disclosure, the method of manufacturing a pore-filled ion exchange polyelectrolyte composite membrane from which the surface ion exchange polyelectrolyte has been removed includes impregnating a porous polymer support 110 with the ion exchange precursor solution 700.

In an embodiment of the present disclosure, the porous polymer support 110 is not limited as long as a material therefor is a hydrocarbon-based polymer. In an embodiment, the porous polymer support 110 may include a substance selected from polyethylene, polypropylene, polyimide, polyamideimide, polypropylene oxide, polyethersulfone, polyurethane, and combinations thereof, and is not limited thereto.

In an embodiment of the present disclosure, the porous polymer support 110 may have a pore volume of 40% to 50%, a pore size of 0.07 μm to 0.1 μm, and a thickness of 8 μm to 30 μm. When the porous polymer support does not satisfy these characteristics, the ion exchange polyelectrolyte composite membrane may not be easily manufactured.

In an embodiment of the present disclosure, the porous polymer support 110 may be hydrophilized by a surfactant before being impregnated with the ion exchange precursor solution 700. In this regard, the surfactant may be any substance that has a hydrophilizing capability, and may be, for example, a substance selected from dodecylbenzenesulfonic acid (DBSA), alkylbenzenesulfonic acid (ABS), linearalklybenzenesulfonic acid (LAS), alphasulfonic acid (AS), alphaolefinsulfonic acid (AOS), alcoholpolyoxyethyleneether (AE), alcoholpolyoxyethyleneethersulfonic acid (AES), and combinations thereof. For example, the surfactant may be DBSA. When the hydrophobic portion of the surfactant is combined with the hydrophobic surface of the porous polymer support 110 by hydrophobic-hydrophobic interaction, the hydrophilic portion of the surfactant may replace (or be exposed to) the surface of the polymer support 110 so that hydrophilization can be achieved. At this time, in addition to the outer surface of the porous polymer support 110, the entire surface of pores thereof may be hydrophilized by the surfactant. Due to the hydrophilization of the entire surface of pores, the ion exchange precursor solution 700, which is hydrophilic, may effectively and easily fill the pores by hydrophilic-hydrophilic interaction. For example, the hydrophilization treatment may be performed such that the porous polymer support 110 is immersed in a solution in which 0.5 parts by weight to 1 part by weight of the surfactant is diluted in water and then dried.

Then, in an embodiment of the present disclosure, the method for preparing the pore-filled ion exchange polyelectrolyte composite membrane from which the surface ion exchange polyelectrolyte has been removed, includes compressing an upper film 200 and a lower film 300 respectively on an upper portion and a lower portion of the porous polymer support 110 by feeding the upper film 200, the porous polymer support 110, and the lower film 300 to a compression roll. In this regard, the compression roll may include an upper compression roll 400 and a lower compression roll 450, which are vertically spaced from each other. That is, there may be two compression rolls.

In an embodiment of the present disclosure, the upper film 200 and the lower film 300 may each be poly(ethylene terephthalate) (PET).

In an embodiment of the present disclosure, the upper film 200 and the lower film 300 may each have a thickness of about 30 μm to about 70 μm, for example, about 50 μm to about 60 μm, but the thicknesses thereof are not limited thereto. When the thickness of each of the upper film 200 and the lower film 300 is less than 30 µm, the porous polymer support 110 is not smoothly detached from the upper film 200 and the lower film 300 after the crosslinking reaction by ultraviolet rays, which will be described later, and thus, the porous polymer support 110 may be torn. On the other hand, when the thickness of each of the upper film 200 and the lower film 300 exceeds 70 µm, ultraviolet rays may not be sufficiently irradiated to the porous polymer support 110, and the crosslinking reaction may not occur sufficiently.

In an embodiment of the present disclosure, regarding each of the upper film 200 and the lower film 300, one surface of each of the upper film 200 and the lower film 300 in contact with the porous polymer support 110 may not be subjected to water-repellent treatment or may be subjected to hydrophilic treatment. The hydrophilization treatment may be performed using, for example, silicone, polyvinyl alcohol, polyallylamine hydrochloride, polyvinylamine, polystyrene sulfonic acid, polyvinyl sulfonic acid, etc. In an embodiment, the hydrophilization treatment may be performed using silicone. That is, by performing a hydrophilization treatment on one surface of each of the upper film 200 and the lower film 300 in contact with the porous polymer support 110, the bonding between each of the upper film 200 and the lower film 300 and the porous polymer support 110, which has been hydrophilized by the surfactant, may be facilitated.

In an embodiment of the present disclosure, the compression may be performed through squeeze compression to have a value smaller than the sum of the thickness of the porous polymer support 110 and the thicknesses of the upper film 200 and the lower film 300 fed into the compression roll. In this regard, the squeeze compression may be performed at a pressure of about 50 kgf/cm$^2$ to about 100 kgf/cm$^2$. In other words, by bonding the porous polymer support 110 and each of the upper film 200 and the lower film 300 more strongly through the squeeze compression, a polymer resin 710, which is formed by polymerization through crosslinking outside of the porous polymer support 110, which will be described later, may be removed by being easily transferred onto the upper film 200 and the lower film 300.

In an embodiment of the present disclosure, the value may be about 5 µm to about 20 µm, for example, about 10 µm to about 15 µm smaller than the sum of the thicknesses of the porous polymer support 110, the upper film 200 and the lower film 300 which are fed to the compression roll. When the value is less than 5 µm smaller than the sum thereof, the polymer resin 710, which is formed by polymerization through crosslinking, on the outside of the porous polymer support 110 may not be removed due to poor transfer to the upper film 200 and the lower film 300, and when the value exceeds 20 µm smaller than the sum thereof, in the following detachment process, the porous polymer support 110 may not be easily detached from the upper film 200 and the lower film 300.

In an embodiment of the present disclosure, the speed at which the upper film 200, the porous polymer support 110, and the lower film 300 are fed into the compression roll may be from about 0.5 M/min to about 2 M/m in, but is not limited thereto. When the speed is less than 0.5 M/min, the feeding process proceeds slowly and production efficiency may be decreased, and when the speed exceeds 2 M/m in, the feeding process proceeds rapidly, and the crosslinking reaction of the ion exchange precursor solution 700 may not be smoothly performed in the subsequent process. However, the speed is not limited to this range.

Then, in an embodiment of the present disclosure, the method for preparing the pore-filled ion exchange polyelectrolyte composite membrane from which the surface ion exchange polyelectrolyte has been removed, includes preparing a pore-filled ion exchange polymer electrolyte by crosslinking the ion exchange precursor solution 700 by irradiating ultraviolet rays, generated by a ultraviolet irradiation device 600, to the porous polymer support 110 on which the upper film 200 and the lower film 300 are compressed.

In an embodiment of the present disclosure, the ultraviolet rays may be irradiated to an upper portion and a lower portion of the porous polymer support 110 on which the upper film 200 and the lower film 300 are compressed.

In an embodiment of the present disclosure, the ultraviolet rays to be irradiated may be classified into UVA, UVB and UVV, and the ultraviolet rays may have different wavelength ranges. In detail, UVA may have a wavelength range of about 320 nm to about 400 nm, UVB may have a wavelength range of about 280 nm to about 320 nm, and UVV may have a wavelength range of about 400 nm to about 450 nm.

In an embodiment of the present disclosure, regarding the energy of the ultraviolet rays to be irradiated, UVA may have the energy of about 40 mW/cm$^2$ to about 50 mW/cm$^2$, UVB may have the energy of about 30 mW/cm$^2$ to about 50 mW/cm$^2$, and UVV may have the energy of about 30 mW/cm$^2$ to about 50 mW/cm$^2$. For example, UVA may have the energy of about 47 mW/cm$^2$, UVB may have the energy of about 37 mW/cm$^2$, and UVV may have the energy of about 35 mW/cm$^2$. When the energy of the ultraviolet rays to be irradiated is less than the lower limits of the respective ranges, the crosslinking reaction of the ion exchange precursor solution 700 may not proceed smoothly, and when the energy exceeds the upper limits of the respective ranges, the energy is too strong and thus, the porous polymer support 110, the upper film 200, and the lower film 300 may be carbonized. However, the energy of the ultraviolet rays to be irradiated is not limited thereto.

In an embodiment of the present disclosure, regarding the irradiation of the ultraviolet rays, UVA may be irradiated for about 360 seconds to about 480 seconds, UVB may be irradiated for about 360 seconds to about 480 seconds, and UVV may be irradiated for about 360 seconds to 480 seconds. When the irradiation of ultraviolet rays is performed for a time less than the lower limits of the respective ranges, the crosslinking reaction of the ion exchange precursor solution 700 may not proceed smoothly, and when the irradiation of ultraviolet rays is performed for a time exceeding the upper limits of the respective ranges, the porous polymer support 110, the upper film 200, and the lower film 300 may be carbonized. However, the irradiation time of the ultraviolet rays is not limited thereto.

In an embodiment of the present disclosure, the temperatures of the porous polymer support 110, the upper film 200 and the lower film 300 during the crosslinking reaction may be about 75° C. or less, for example, the temperature may be about 60° C. to about 75° C. When the temperature exceeds 75° C., evaporation of the solvent in the ion exchange precursor solution 700 may be triggered and crosslinking reactions by polymerization may not be induced, and the porous polymer support 110, the upper film 200 and the lower film 300 may be carbonized.

Then, in an embodiment of the present disclosure, the method for preparing the pore-filled ion exchange polyelectrolyte composite membrane from which the surface ion exchange polyelectrolyte has been removed, includes detaching, from a detachment roll, the porous polymer support 110 containing the pore-filled ion exchange polymer electrolyte, the upper film 200, and the lower film 300. In this regard, the detachment roll may include an upper detachment roll 500 and a lower detachment roll 550 which are vertically spaced apart from each other. That is, there may be two detachment rolls. In an embodiment of the present disclosure, a polymer resin 710, which is formed by polymerization through crosslinking, formed outside of the porous polymer support 110 may be transferred onto the upper film 200 and the lower film 300 and removed from the porous polymer support 110 through the detachment.

In an embodiment of the present disclosure, the interval between the upper detachment roll 500 and the lower detachment roll 550 may equal to the sum of the thicknesses of the porous polymer support 110, the upper film 200, and the lower film 300 before being fed into the compression roll. In this regard, the porous polymer support 110 before being introduced to the compression roll refers to the porous polymer support 110 before being impregnated with the ion exchange precursor solution 700. That is, the thickness of the porous polymer support 110 may be the thickness of the porous polymer support 110 which does not include the ion exchange precursor solution 700.

In an embodiment of the present disclosure, the detachment may be performed by pulling the upper film 200 and the lower film 300, which have passed the detachment roll, on the other side (i.e., pulling the upper film 200 and the lower film 300 away from the porous polymer support 110), and in this regard, the direction of the other side may be a diagonal direction from each of the upper detachment roll 500 and the lower detachment roll 550.

In an embodiment of the present disclosure, the method of manufacturing the ion exchange polyelectrolyte composite membrane is performed using a roll-to-roll process, and thus, the ion exchange polyelectrolyte composite membrane may be manufactured continuously. Accordingly, the manufacturing process is simple and costs therefore low.

A second aspect of the present disclosure provides a pore-filled ion exchange polyelectrolyte composite membrane from which the surface ion exchange polyelectrolyte has been removed, the pore-filled ion exchange polyelectrolyte composite membrane including: a polymer support having a porous structure; and an ion exchange polyelectrolyte impregnating the polymer support, wherein the ion exchange polyelectrolyte is not formed outside the polymer support and the porous structure of the polymer support is exposed to the surface of the ion exchange polyelectrolyte composite membrane.

Detailed descriptions that have been provided above in connection with the first aspect, are omitted in the embodiments to be explained with respect to the second aspect. However, the detailed descriptions may be equally applied to the second aspect.

Hereinafter, the pore-filled ion exchange polyelectrolyte composite membrane from which the surface ion exchange polyelectrolyte has been removed according to the second aspect of the present disclosure will be described in detail.

In an embodiment of the present disclosure, the pore-filled ion exchange polyelectrolyte composite membrane may be an anion exchange polyelectrolyte composite membrane or a cation exchange polyelectrolyte composite membrane.

In an embodiment of the present disclosure, the pore-filled ion exchange polyelectrolyte composite membrane may be formed by removing a single ion exchange polyelectrolyte layer from a surface thereof.

In an embodiment of the present disclosure, the wording 'the ion exchange polyelectrolyte is not formed the outside of the polymer support' should be interpreted as the ion exchange polyelectrolyte may be formed on 'at least a portion of the polymer support.' In addition, the exposure of the porous structure of the polymer support to the surface of the ion exchange polymer electrolyte composite membrane should be interpreted to mean that at least a portion of the porous structure may be exposed, and that the porous structure on the surface of the polymer support is exposed.

In an embodiment of the present disclosure, the pore-filled ion exchange polyelectrolyte composite membrane from which the surface ion exchange polyelectrolyte has been removed does not have any by-products due to the removal of a polymer resin, which is formed by polymerization through crosslinking, formed on the outside of a porous polymer support, and may be thin. In an embodiment, the thickness of the prepared composite membrane may be from about 8 μm to about 30 μm, for example, about 16 μm.

In an embodiment of the present disclosure, the pore-filled ion exchange polyelectrolyte composite membrane may have an area specific resistance (ASR) of about 0.35 $\Omega \cdot cm^2$ or less. Preferably, when the composite membrane is an anion exchange polyelectrolyte composite membrane, the area specific resistance (ASR) thereof may be about 0.23 $\Omega \cdot cm^2$ or less, and when the composite membrane is a cation exchange polyelectrolyte composite membrane, the area specific resistance (ASR) thereof may be about 0.35 $\Omega \cdot cm^2$ or less.

In an embodiment of the present disclosure, when the pore-filled ion exchange polyelectrolyte composite membrane is an anion exchange polyelectrolyte composite membrane, an electrolyte monomer of a quaternary ammonium salt having a cationic group may be used as an electrolyte monomer, and when the pore-filled ion exchange polyelectrolyte composite membrane is a cation exchange polyelectrolyte composite membrane, an electrolyte monomer of a sulfonate having an anionic group may be used as an electrolyte monomer.

In an embodiment of the present disclosure, the surface roughness height of the pore-filled ion exchange polyelectrolyte composite membrane may dominantly be from 200 nm to 350 nm. In an embodiment, the surface roughness height of the pore-filled ion exchange polyelectrolyte composite membrane may be from 250 nm to 350 nm, and, depending on the conditions of detachment process and a monomer used, the surface roughness height thereof may be from 300 nm to 350 nm. The surface roughness height may have various values, but it is a dominant expression that the above range may be included most, and can be seen as an average of the roughness height. Meanwhile, the roughness average of the composite membrane may be from 10 nm to 60 nm, for example, from 25 nm to 45 nm. Within the ranges, the pore-filled ion exchange polyelectrolyte composite membrane may exhibit maximum performance. Therefore, since the pore-filled ion exchange polyelectrolyte composite membrane has a higher surface roughness, a turbulence flow occurs in the solution flowing through the composite membrane, and thus, the diffusion boundary layer has a small value, thereby allowing the ions of the solution to pass through the composite membrane more easily. For example, in the case of a composite membrane with a lower surface roughness, a bottleneck occurs because the solution flowing through the composite membrane flows in a laminar flow, and thus, the ions in the solution may not flow through the composite membrane as a whole, so that the diffusion boundary layer has a high value. However, in the case of the pore-filled ion exchange polyelectrolyte composite membrane, turbulence is generated in the solution flowing through the composite membrane, so that the ions of the solution may flow through the composite membrane as a whole, so ion exchange may proceed more efficiently.

In an embodiment of the present disclosure, the ratio of the thickness of the pore-filled ion exchange polyelectrolyte composite membrane to the thickness of the porous polymer support may be from about 1.0 to about 1.03. Since the polymer support is filled with an ion exchange polyelectrolyte, the thickness of the composite membrane may be the same as the thickness of the polymer support, or may be slightly greater than the thickness of the polymer support due to the surface roughness generated when the polymer electrolyte is removed from the surface thereof. When the thickness ratio is greater than 1.03, the polymer electrolyte is not completely removed from the surface of the composite membrane and may act as an obstacle factor for the ion exchange. For example, the thickness ratio may be from 1.0 to 1.02.

In an embodiment of the present disclosure, a weight (mass) ratio of the polymer support to the ion exchange polyelectrolyte may 1:0.8 to 1:1.1. When the weight ratio of the ion exchange polyelectrolyte filling the polymer support is less than 1:0.8, the ion exchange polymer electrolyte may not sufficiently fill the polymer support, making it difficult to exhibit physical and electrochemical properties in an ion exchange membrane to be implemented. When the weight ratio of the ion exchange polyelectrolyte filling the polymer support exceeds 1:1.1, the polymer electrolyte remains on the surface of the composite membrane, so that the occurrence of turbulence may not be induced in the composite membrane.

In an embodiment of the present disclosure, the swelling degree of the pore-filled ion exchange polyelectrolyte composite membrane from which the surface ion exchange polyelectrolyte has been removed may be from 30% to 40% in the case of an anionic exchange composite membrane and from 40% to 50% in the case of a cationic exchange composite membrane. As such, the swelling degree of the composite membrane according to the embodiments of the present disclosure may be greater than that of conventional polymer electrolyte composite membranes.

Hereinafter, examples of the present disclosure will be described in detail so that a person with ordinary knowledge in the technical field to which the present disclosure belongs may easily implement the present disclosure. However, the present disclosure may be implemented in various different forms and is not limited to the examples described herein.

Preparation Example 1. Preparation of Anion Exchange Polyelectrolyte Composite Membrane To prepare an anion exchange polyelectrolyte composite membrane, (3-acrylamidopropyl)trimethylammonium chloride, 1,4-bis(acryloyl)piperazine, and deionized water were mixed and stirred at the weight ratio of 12:1:10, and 2-hydroxy-2-methyl-1-phenylpropane-1-one diluted at the concentration of 10 wt % in methanol, which was used as a photoinitiator, was mixed therewith in the amount of 0.1 parts by weight to 0.5 parts by weight based on 100 parts by weight of the resultant mixed solution.

Then, a polyolefin porous polymer support, which was prepared by immersion in a solution, in which 0.5 parts by weight to 1 part by weight of commercially available surfactant (dodecylbenzenesulfonic acid (DBSA)) was diluted in water, for one minute to two minutes, and then dried to hydrophilize the surface of pores thereof. The polyolefin porous polymer support had the thickness of 16 µm, the average pore size of 0.07 µm, and the pore volume of 45%. The polyolefin porous polymer support was impregnated with the anion ion exchange precursor solution such that the anion ion exchange precursor solution sufficiently permeated into the polyolefin porous polymer support.

Then, in order to laminate a 50 µm-thick poly(ethylene terephthalate) (PET) films on an upper portion and lower portion of the polyolefin porous polymer support into which the precursor solution permeates, the support and the films were fed to the upper compression roll and the lower compression roll at a rate of 1 M/min. At this time, the films were hydrophilic treated with silicone on one surface of each of the films in contact with the support before being put into the compression rolls. Meanwhile, the pressure applied by the upper compression roll and the lower compression roll was 50 kgf/cm$^2$ so that a squeeze compression was performed, and due to the squeeze compression, the sum of the support thickness and the films was decreased by 10 µm.

Thereafter, the support and the films fed to the compression rolls were irradiated with ultraviolet rays of about 47 mW/cm$^2$ in the case of UVA, about 37 mW/cm$^2$ in the case of UVB, and about 35 mW/cm$^2$ in the case of UVV to cause crosslinking of the anion exchange polyelectrolyte solution permeated into the support, thereby synthesizing an anion exchange polyelectrolyte. At this time, the temperature of each of the support and the films was 75° C.

The support and the films each containing the synthesized anion exchange polyelectrolyte were separated by passing through an upper detachment roll and a lower detachment roll. In this regard, the interval between the upper detachment roll and the lower detachment roll was equal to the sum of the thickness of the porous polymer support and the thicknesses of the films before the porous polymer support and the films were fed to the compression rolls, and a polymer resin, which was formed by polymerization through crosslinking, formed on the outside of the support was transferred onto the upper film and the lower film by passing through the detachment rolls and removed. Then, the support containing the obtained synthesized anion exchange polyelectrolyte was washed several times with ultrapure water to obtain an anion exchange polyelectrolyte composite membrane.

Preparation Example 2. Preparation of Cation Exchange Polyelectrolyte Composite Membrane The cation exchange polyelectrolyte composite membrane was prepared using the same method as the anion exchange polyelectrolyte composite membrane of Preparation Example 1, except that the following method was performed to prepare the cation exchange precursor solution.

Sodium 2-acrylamido-2-methylpropane sulfonate, 1,4-bis (acryloyl)piperazine, and deionized water were mixed and stirred at the weight ratio of 6:1:6, and 2-hydroxy-2-methyl-1-phenylpropane-1-one diluted at the concentration of 10 wt % in methanol, which was used as a photoinitiator, was mixed therewith in the amount of 0.1 parts by weight to 0.5 parts by weight based on 100 parts by weight of the resultant mixed solution, thereby completing the preparation of a cation exchange precursor solution.

Thereafter, a cation exchange polyelectrolyte composite membrane was prepared by performing the same method as the anion exchange polyelectrolyte composite membrane of Preparation Example 1.

Comparative Example 1. Ion Exchange Polyelectrolyte Composite Membrane without Squeeze Compression Except that the squeeze compression was not performed, an anion exchange polyelectrolyte composite membrane and a cation exchange polyelectrolyte composite membrane were prepared using the same method as in Preparation Examples 1 and 2.

Comparative Example 2. Ion Exchange Polyelectrolyte Composite Membrane of Fuma-Tech Inc An anion exchange polyelectrolyte composite membrane (FAS) and a cation exchange polyelectrolyte composite membrane (FKS) were obtained from Fuma-tech inc.

Comparative Example 3. Ion Exchange Polyelectrolyte Composite Membrane of Tokuyama Inc An anion exchange polyelectrolyte composite membrane (AMX) and a cation exchange polyelectrolyte composite membrane (CMX) were obtained from Tokuyama Inc.

Comparative Example 4. Ion Exchange Polyelectrolyte Composite Membrane of Asahi Inc An anion exchange polyelectrolyte composite membrane (AMV) and a cation exchange polyelectrolyte composite membrane (CMV) were obtained from Asahi Inc.

Figure 2:
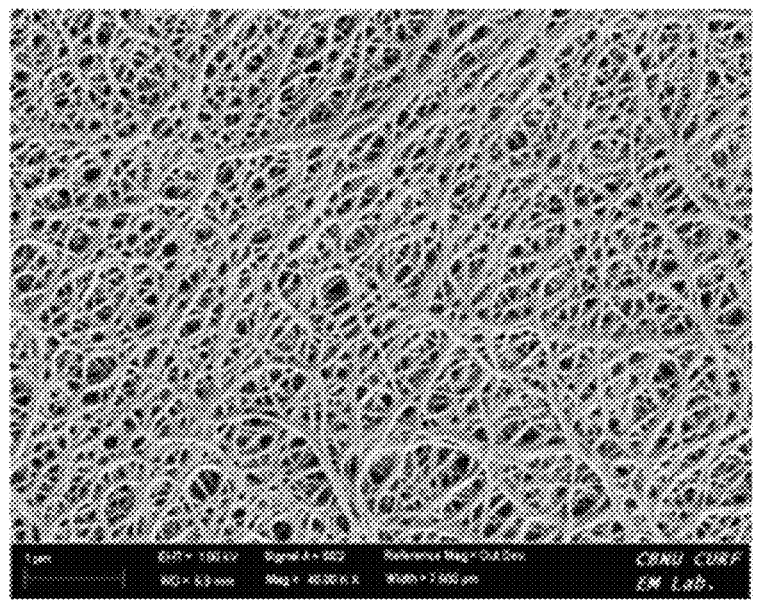
FIG. 2 shows a scanning electron microscope (SEM) image of the surface of a porous polymer support according to an embodiment of the present disclosure.
Figure 3:
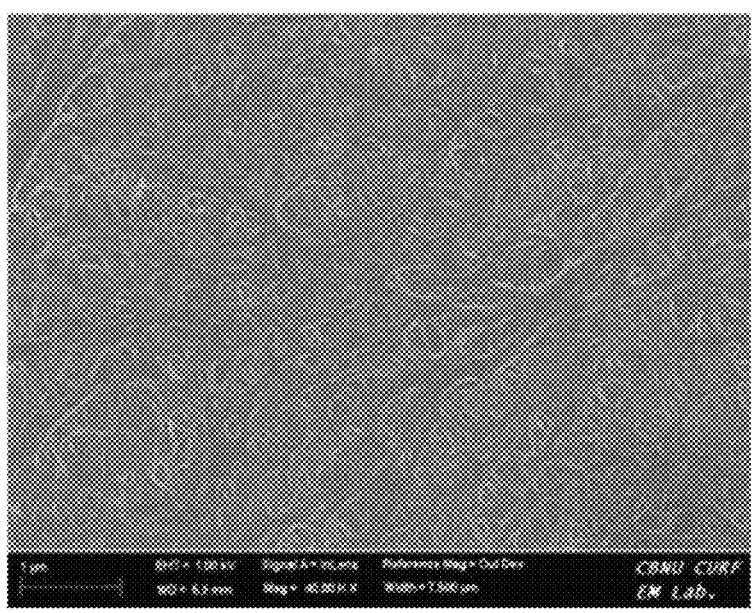
FIG. 3 shows a SEM image of the surface of an ion exchange polyelectrolyte composite membrane manufactured by performing squeeze compression according to an embodiment of the present disclosure.
Figure 5:
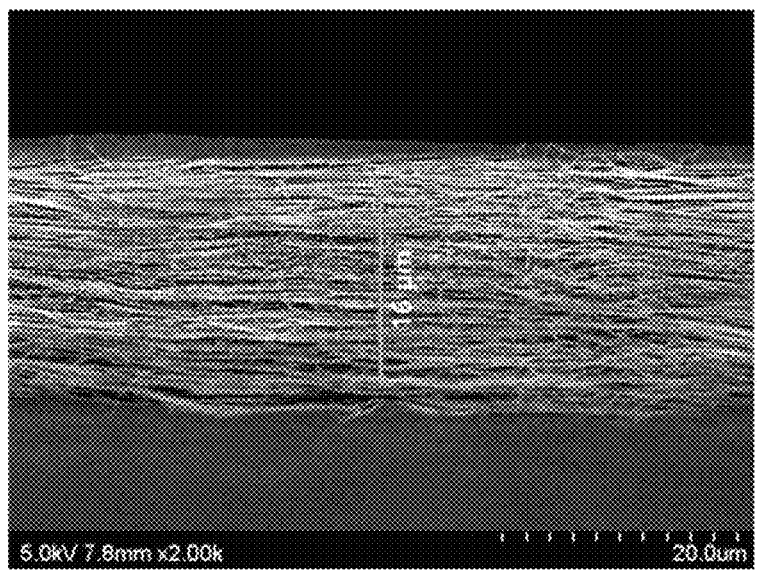
FIG. 5 shows a SEM image of the cross-section of a porous polymer support according to an embodiment of the present disclosure.
Figure 6:
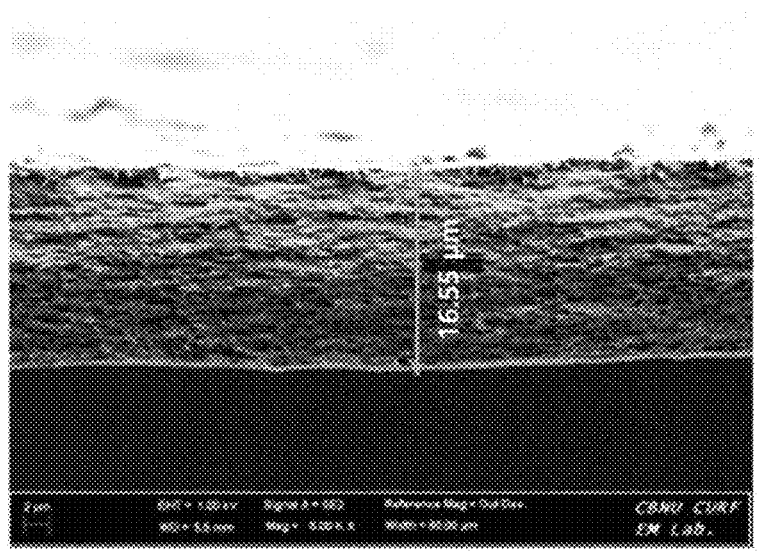
FIG. 6 shows a SEM image of the cross-section of an ion exchange polyelectrolyte composite membrane manufactured by performing squeeze compression according to an embodiment of the present disclosure.

Experimental Example 1. Analysis on Surface and Cross-Section of Ion Exchange Polyelectrolyte Composite Membranes FIGS. 2 and 5 show scanning electron microscope (SEM) images of the surface and cross section of the polyolefin porous polymer support used in Preparation Example 1 and Comparative Example 1, respectively. FIGS. 3 and 6 respectively show SEM images of the surface and cross section of the anion exchange polyelectrolyte composite membrane prepared in Preparation Example 1. As shown in FIG. 3, it can be seen that the pore structure appears at the surface of the anion exchange polyelectrolyte composite membrane prepared in Preparation Example 1 due to the removal of the polymer resin, which was formed by polymerized through crosslinking, formed on the surface thereof. In addition, as shown in FIG. 6, the thickness of the composite membrane was about 16.55 µm, which was almost the same as the thickness of the porous polymer support (about 16 µm). This result shows that the polymer resin, which was formed by polymerization through crosslinking, formed on the surface thereof was removed.

Figure 4:
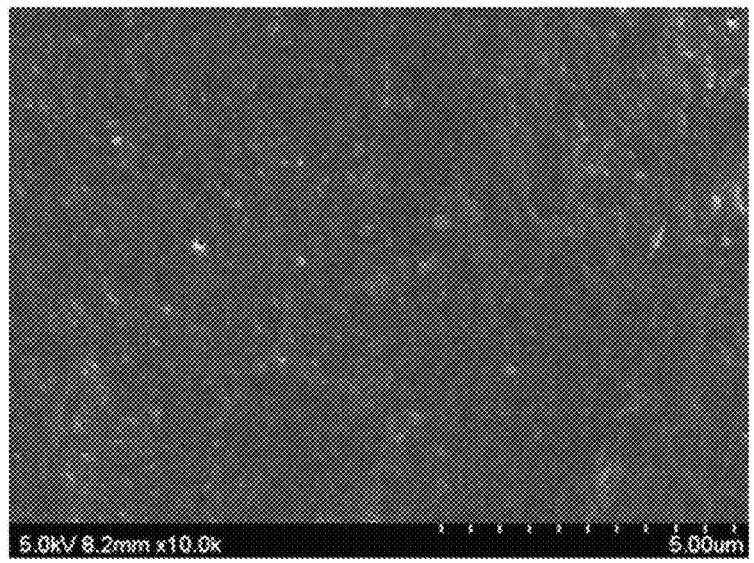
FIG. 4 shows a SEM image of the surface of an ion exchange polyelectrolyte composite membrane manufactured without squeeze compression according to a comparative embodiment of the present disclosure.
Figure 7:
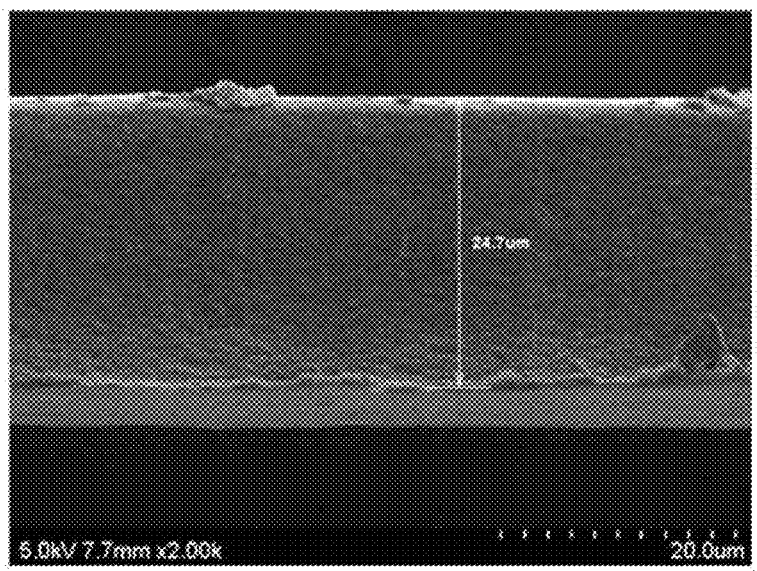
FIG. 7 shows a SEM image of the cross-section of an ion exchange polyelectrolyte composite membrane manufactured without squeeze compression according to a comparative embodiment of the present disclosure.

FIGS. 4 and 7 respectively show SEM images of the surface and cross section of the anion exchange polyelectrolyte composite membrane prepared in Comparative Example 1. As shown in FIG. 4, it can be seen that the pore structure did not appear at the surface of the anion exchange polyelectrolyte composite membrane prepared in Comparative Example 1 since the polymer resin, which was formed by polymerized through crosslinking, formed on the surface thereof was not removed. In addition, as shown in FIG. 7, the thickness of the composite membrane was about 24.7 µm, which was substantially greater than the thickness of the porous polymer support (about 16 µm). This result shows that the polymer resin, which was formed by polymerization through crosslinking, formed on the surface thereof was not removed sufficiently.

Figure 8:
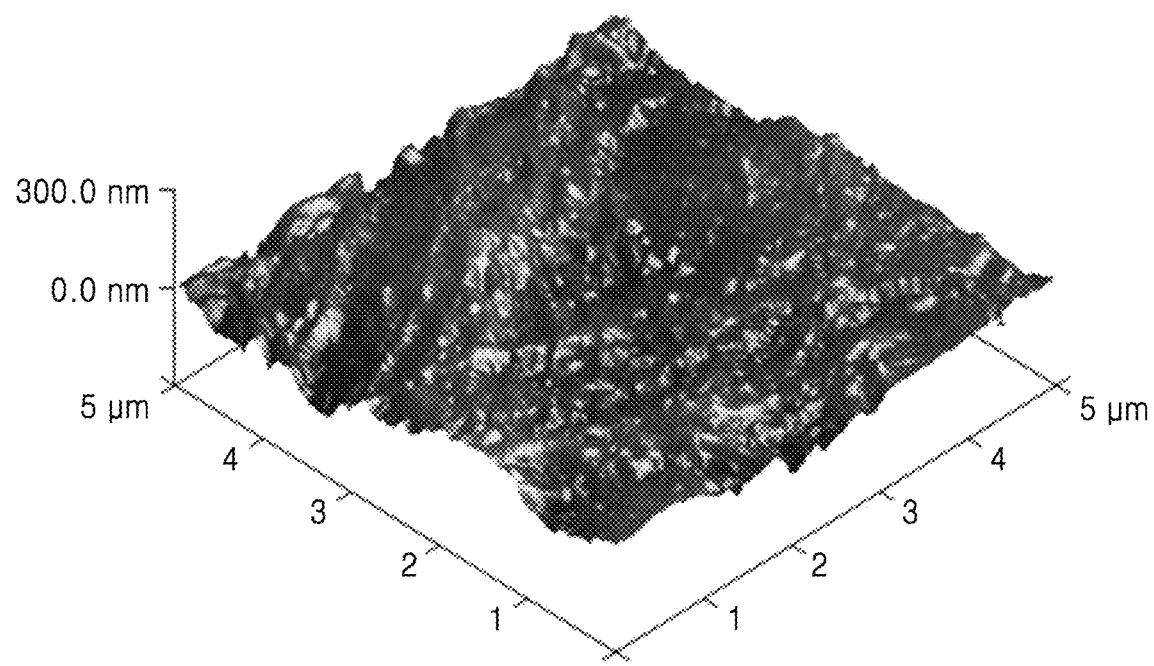
FIG. 8 shows an atomic force microscope (AFM) image of an anion exchange polyelectrolyte manufactured by performing squeeze compression according to Preparation Example 1 of the present disclosure.
Figure 9:
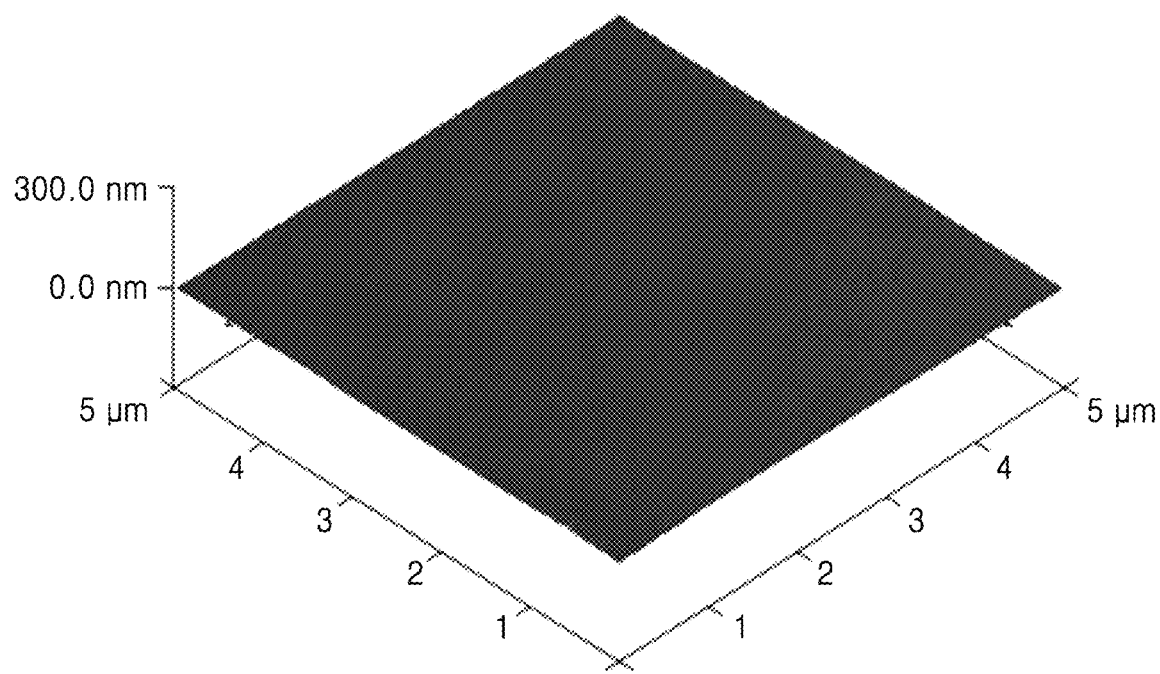
FIG. 9 shows an AFM image of an anion exchange polyelectrolyte according to Comparative Example 1 of the present disclosure.
Figure 10:
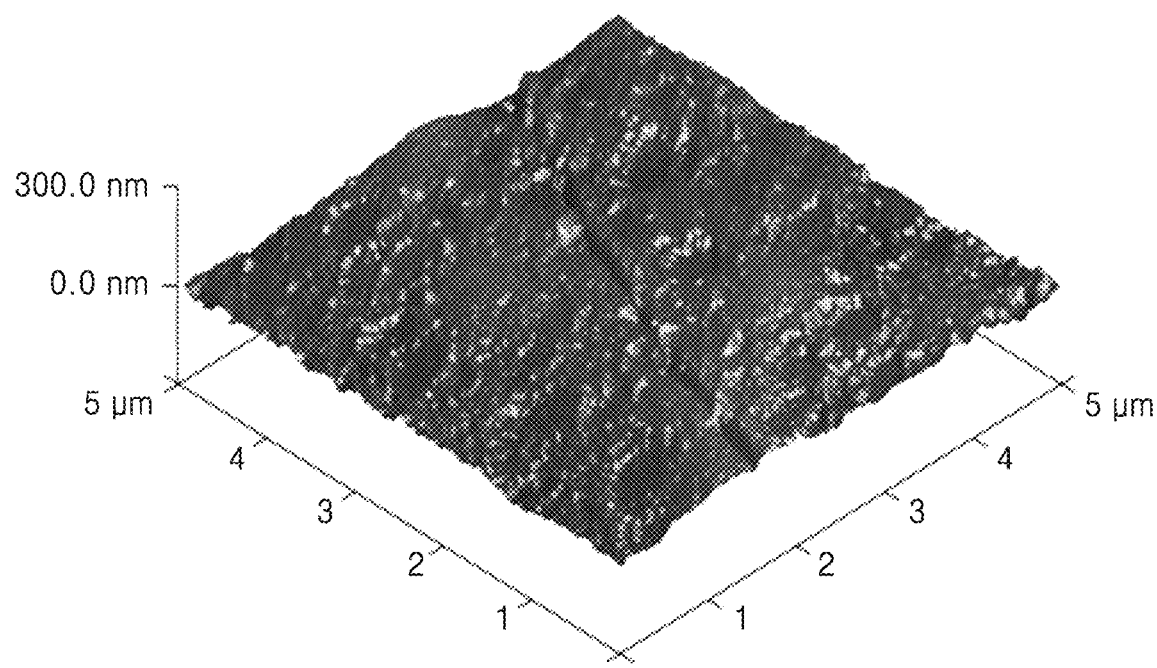
FIG. 10 shows an AFM image of an anion exchange polyelectrolyte according to Comparative Example 2 of the present disclosure.
Figure 11:
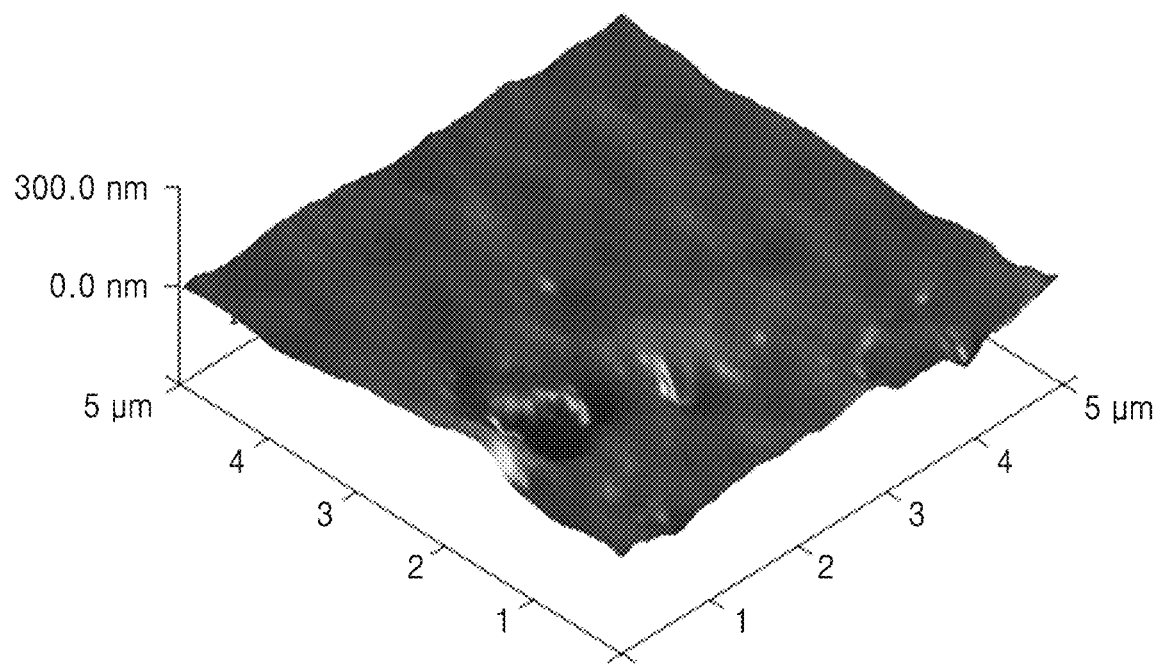
FIG. 11 shows an AFM image of an anion exchange polyelectrolyte according to Comparative Example 3 of the present disclosure.
Figure 12:
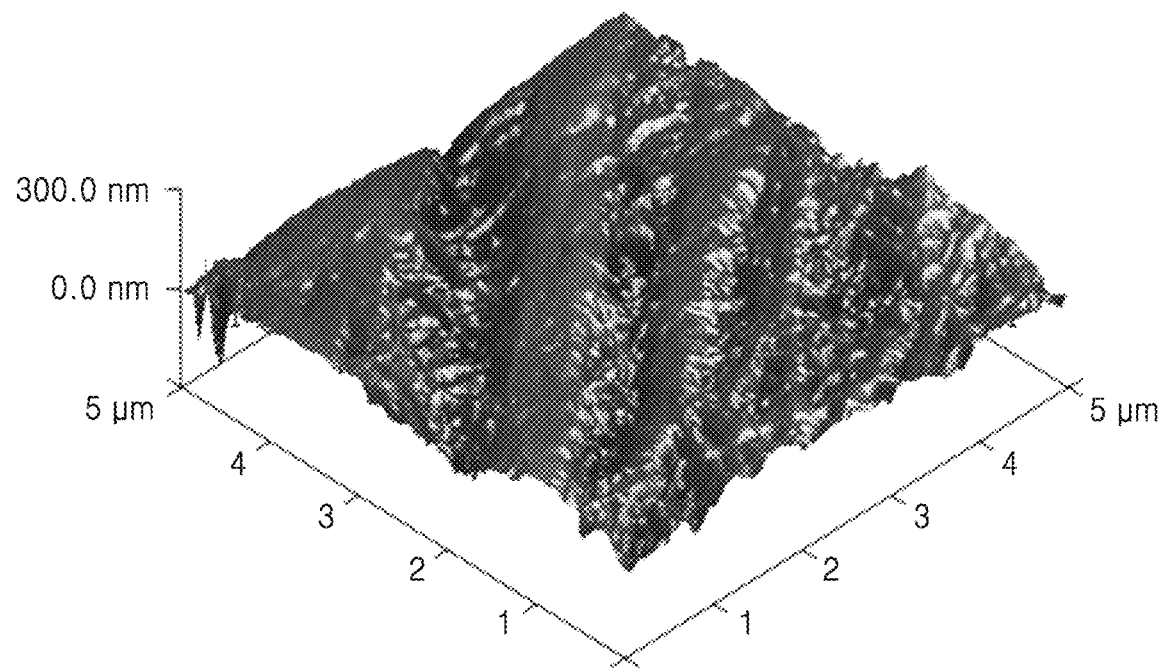
FIG. 12 shows an AFM image of a cation exchange polyelectrolyte manufactured by performing squeeze compression according to Preparation Example 2 of the present disclosure.
Figure 13:
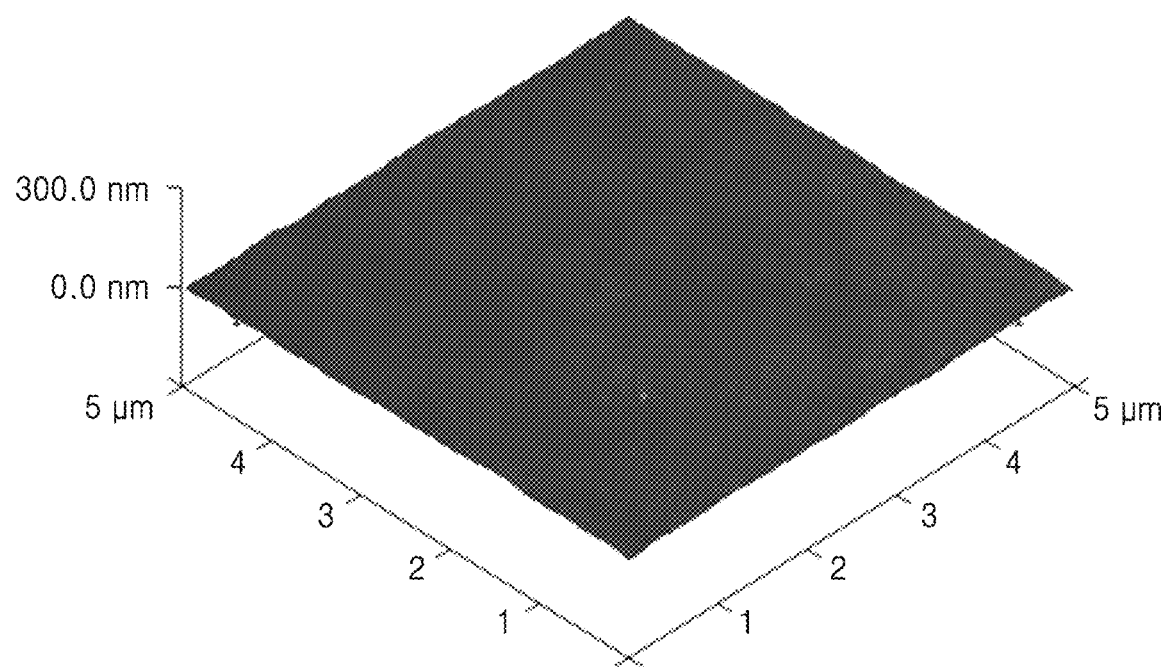
FIG. 13 shows an AFM image of a cation exchange polyelectrolyte according to Comparative Example 1 of the present disclosure.
Figure 14:
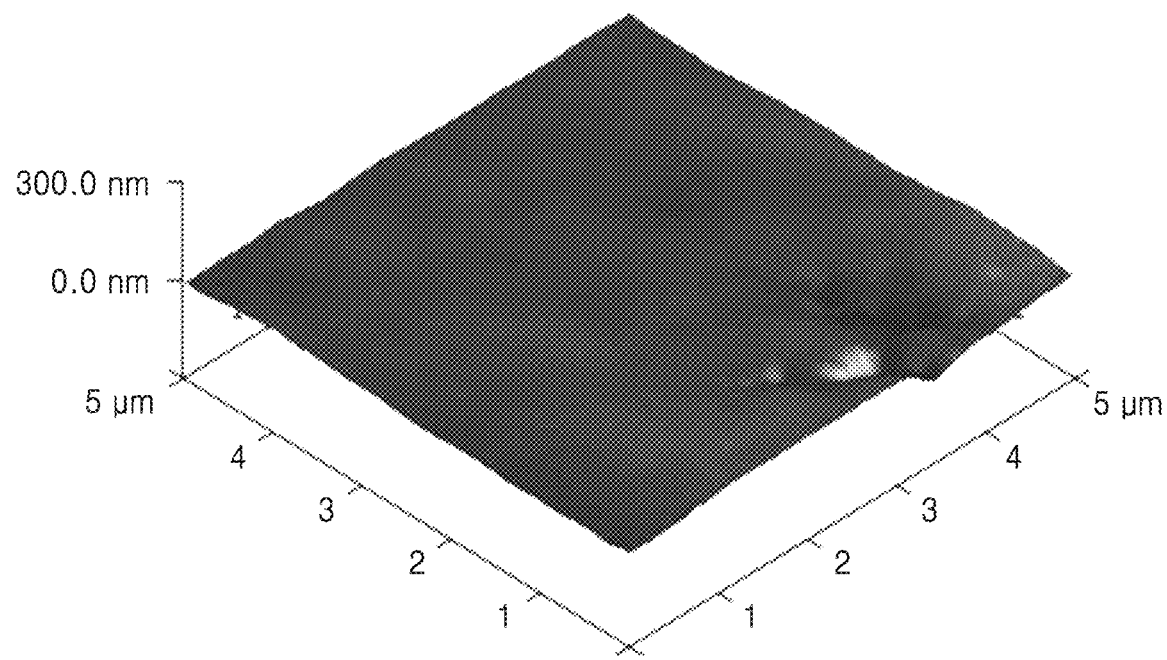
FIG. 14 shows an AFM image of a cation exchange polyelectrolyte according to Comparative Example 2 of the present disclosure.
Figure 15:
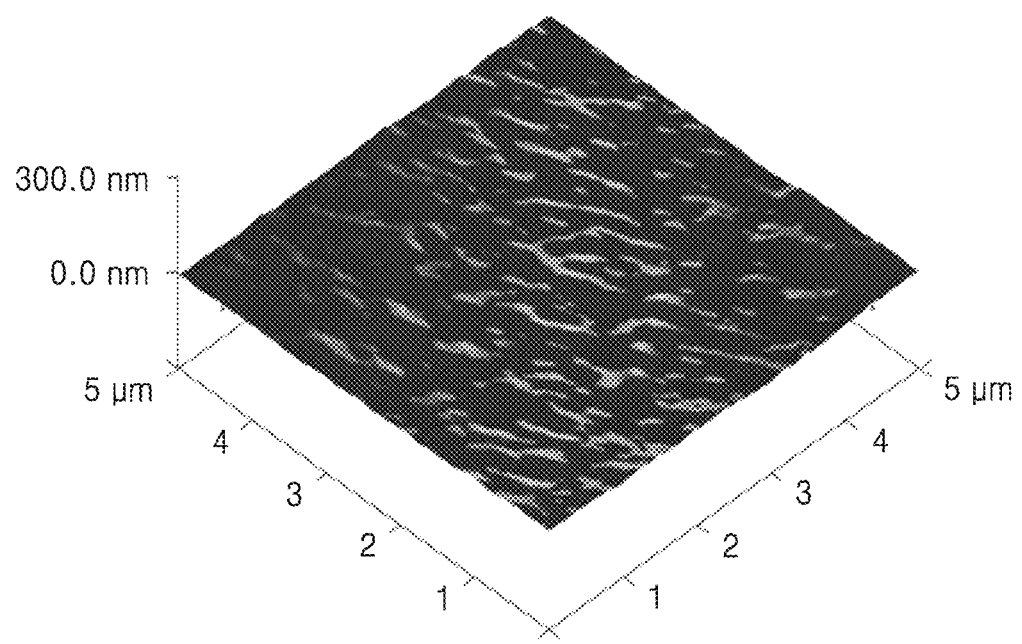
FIG. 15 shows an AFM image of a cation exchange polyelectrolyte according to Comparative Example 3 of the present disclosure.

Experimental Example 2. Analysis of roughness of surface of ion exchange polyelectrolyte composite membrane according to Preparation Example and Comparative Example The roughness of the surface of each of the anion and cation exchange polyelectrolyte composite membranes prepared according to Preparation Example 1 (FIG. 8), Preparation Example 2 (FIG. 12) and Comparative Example 2 (FIGS. 9 and 13), Comparative Example 3 (FIGS. 10 and 14), and Comparative Example 4 (FIGS. 11 and 15) was analyzed by atomic force microscopy (AFM) and shown in FIGS. 8 to 15. The roughness values are shown in Table 1 below.

TABLE 1

| Ion exchange polyelectrolyte composite membrane | | Dominant surface roughness height (nm) |
|---|---|---|
| Anion composite membrane | Preparation Example 1 | 348 |
| | Comparative Example 2 | 20.7 |
| | Comparative Example 3 | 127 |
| | Comparative Example 4 | 195 |
| Cation composite membrane | Preparation Example 2 | 332 |
| | Comparative Example 2 | 23.8 |
| | Comparative Example 3 | 95.0 |
| | Comparative Example 4 | 87.3 |

As shown in FIGS. 8 to 15 and Table 1, it was confirmed that the ion exchange electrolyte composite membranes prepared in Preparation Examples 1 and 2 exhibited a significantly higher dominant surface roughness height compared to the ion exchange electrolyte composite membranes prepared in Comparative Examples 2 to 4. In addition, the roughness averages of the anion exchange composite membrane and the cation exchange composite membrane were 27.3 nm and 43.6 nm, respectively, which was about 2 to about 27 times greater than that of Comparative Examples 2 to 4.

Experimental Example 2. Analysis on Characteristics of Ion Exchange Polyelectrolyte Composite Membranes According to Preparation Example and Comparative Examples The characteristics of the anion and cation exchange polyelectrolyte composite membranes according to Preparation Examples 1 to 2 and Comparative Examples 2 to 4 were analyzed, and the results thereof are shown in Table 2 below.

TABLE 2

| Ion exchange polyelectrolyte composite membrane | | $T_{dry}$ [µm] | $T_{wet}$ [µm] | SD [%] | IEC [meq $6_{hrs}^{-1}$] | R [Ω · cm$^2$] | α [%] |
|---|---|---|---|---|---|---|---|
| Anion composite membrane | Preparation Example 1 | 16 | 21 | 67.9 | 1.68 | 0.29 | 96.4 |
| | Comparative Example 2 | 36 | 42 | 25.0 | 1.12 | 1.09 | 69.4 |
| | Comparative | 121 | 131 | 16.6 | 1.25 | 2.36 | 90.7 |

TABLE 2-continued

| Ion exchange polyelectrolyte composite membrane | | $T_{dry}$ [μm] | $T_{wet}$ [μm] | SD [%] | IEC [meq $6_{hrs}^{-1}$] | R [Ω · cm²] | α [%] |
|---|---|---|---|---|---|---|---|
| | Example 3 | | | | | | |
| | Comparative Example 4 | 108 | 116 | 21.2 | 1.78 | 3.15 | 67.3 |
| Cation composite membrane | Preparation Example 2 | 16 | 21 | 43.1 | 1.61 | 0.66 | 97.5 |
| | Comparative Example 2 | 64 | 35 | 21.6 | 1.54 | 1.50 | 94.2 |
| | Comparative Example 3 | 157 | 174 | 24.4 | 1.62 | 2.91 | 88.0 |
| | Comparative Example 4 | 110 | 124 | 30.3 | 2.01 | 2.29 | 88.9 |

In Table 2, $T_{dry}$ is the thickness of a dry film, $T_{wet}$ is the thickness of a film swollen in the ultrapure water solution, a swelling degree (SD) is an increase in the volume of a film swelled in the ultrapure water solution compared to the dry-film volume, an ion exchange capacity (IEC) is an ion exchange capacity corresponding to the equivalent of a functional group contained in the dry-membrane unit mass, R (resistance) is the membrane resistance per unit area, and a represents a selective permeability capable of repulsion of free co-ion with respect to the fixed charge, which is a functional group of an ion exchange membrane. As shown in the Table 2, it was confirmed that the anion and cation exchange electrolyte composite membranes prepared according to Preparation Examples 1 and 2 were significantly thinner, and had smaller film resistance values compared to Comparative Examples 2 to 4. In particular, as shown in Experimental Example 2, since the anion and cation exchange electrolyte composite membranes prepared according to Preparation Examples 1 and 2 has a very high roughness value, turbulence is formed in the solution flowing through the composite membranes, and thus, a diffusion boundary layer has a small value. Accordingly, it was confirmed that the anion and cation exchange electrolyte composite membranes prepared according to Preparation Examples 1 and 2 have small film resistance values.

What is claimed is:

1. A method of manufacturing a pore-filled ion exchange polyelectrolyte composite membrane from which a surface ion exchange polyelectrolyte has been removed, the method comprising:
    preparing an ion exchange precursor solution including an electrolyte monomer of a quaternary ammonium salt having a cationic group or a sulfonic acid-containing electrolyte monomer having an anionic group, an acrylamide-based crosslinking agent having a tertiary amine functional group, an initiator, and a solvent;
    impregnating a porous polymer support with the ion exchange precursor solution; feeding an upper film, the porous polymer support, and a lower film to a compression roll to compress the upper film and the lower film on upper and lower portions of the porous polymer support, respectively, wherein the compression is performed through squeeze compression to have a value smaller than the sum of the thickness of the porous polymer support and the thicknesses of the upper film and the lower film fed into the compression roll;
    preparing a pore-filled ion exchange polymer electrolyte by crosslinking the ion exchange precursor solution by irradiating ultraviolet rays to the porous polymer support on which the upper film and the lower film are compressed; and
    detaching, from a detachment roll, the porous polymer support containing the pore-filled ion exchange polymer electrolyte, the upper film, and the lower film, wherein a dominant surface roughness height of the pore-filled ion exchange polyelectrolyte composite membrane is from 250 nm to 350 nm;
    wherein through the detachment, a polymer resin, which is formed by polymerization through crosslinking, formed on the outside of the porous polymer support is transferred onto the upper film and the lower film and removed from the porous polymer support.

2. The method of claim 1, wherein the electrolyte monomer of a quaternary ammonium salt having a cationic group comprises a substance selected from (3-acrylamidopropyl) trimethylammonium chloride, (vinylbenzyl) trimethylammonium chloride, and combinations thereof.

3. The method of claim 1, wherein the sulfonic acid-containing electrolyte monomer having an anionic group comprises a substance selected from sodium 2-acrylamido-2-methylpropane sulfonate, vinylsulfonic acid, sodium vinylsulfonate, sodium allyl sulfonate, sodium 2-methyl-2-propene-1-sulfonate, 3-sulfopropyl acrylate sodium salt, and combinations thereof.

4. The method of claim 1, wherein the acrylamide-based crosslinking agent having a tertiary amine functional group comprises a substance selected from N,N'bis(acryloyl)piperazine, N,N'-(1,2-dihydroxyethylene)bisacrylamide, N,N'-methylenebisacrylamide, N,N'-methylenebismethacrylamide, and combinations thereof.

5. The method of claim 1, wherein the porous polymer support has a pore volume of 40% to 50%, a pore size of 0.07 μm to 0.1 μm, and a thickness of 8 μm to 30 μm.

6. The method of claim 1, wherein the porous polymer support is subjected to a hydrophilization treatment before being impregnated with the ion exchange precursor solution.

7. The method of claim 1, wherein each of the upper film and the lower film includes a substance selected from poly(ethylene terephthalate) (PET), polyimide, polyvinyl chloride, low-density polyethylene, low-density polypropylene, and combinations thereof.

8. The method of claim 1, wherein one surface of each of the upper film and the lower film in contact with the porous polymer support has been subjected to a hydrophilization treatment.

9. The method of claim 1, wherein the value is smaller than the sum of the thickness of the porous polymer support and the thicknesses of the upper film and the lower film fed into the compression roll, by 5 μm to 20 μm.

10. The method of claim 1, wherein an energy of the ultraviolet rays to be irradiated is 30 mW/cm2 to 50 mW/cm2.

11. The method of claim 1, wherein during the crosslinking reaction, the temperature of the porous polymer support, the upper film and the lower film is equal to or lower than 75° C.

* * * * *